United States Patent [19]

Morini et al.

[11] Patent Number: 5,244,855
[45] Date of Patent: Sep. 14, 1993

[54] COMPONENTS AND CATALYSTS FOR THE POLYMERIZATION OF OLEFINS

[75] Inventors: Giampiero Morini, Pavia; Enrico Albizzati, Novara, both of Italy

[73] Assignee: Himont Incorporated, Wilmington, Del.

[21] Appl. No.: 856,773

[22] Filed: Mar. 24, 1992

[30] Foreign Application Priority Data

Mar. 27, 1991 [IT] Italy .............................. MI91A000813

[51] Int. Cl.$^5$ .............................................. C08F 4/654
[52] U.S. Cl. ..................................... 502/126; 502/109;
502/115; 502/116; 502/121; 502/122; 502/123;
502/125; 502/127; 502/133; 502/134; 526/125
[58] Field of Search ............... 502/109, 126, 133, 134,
502/125, 127, 121, 122, 123, 115, 116

[56] References Cited

U.S. PATENT DOCUMENTS

| 4,263,168 | 4/1981 | Rochefort et al. | 502/115 X |
| 5,064,799 | 11/1991 | Monte et al. | 502/115 |
| 5,139,985 | 8/1992 | Barbé et al. | 502/109 |

FOREIGN PATENT DOCUMENTS

| 1306044 | 2/1973 | United Kingdom . |
| 2028347 | 3/1980 | United Kingdom . |

Primary Examiner—Patrick P. Garvin

[57] ABSTRACT

Catalyst components for the polymerization of olefins obtained by reacting a tetravalent titanium halide or halogen alcoholate and an electron-donor compound with a porous polymer support on which is supported a magnesium dihalide or a magnesium compound which does not contain Mg—C bonds and can be transformed into a dihalide, characterized in that the Mg content before and after the reaction with titanium compound ranges from 6 to 12% by weight.

6 Claims, No Drawings

COMPONENTS AND CATALYSTS FOR THE POLYMERIZATION OF OLEFINS

This invention relates to catalyst components for the (co)polymerization $CH_2=CHR$ olefins, where R is hydrogen or a linear or branched alkyl radical with 1-6 carbon atoms, or an aryl radical, and the catalysts obtained therefrom.

The preparation of catalyst components comprising a titanium halide and Mg halides by supporting the above mentioned titanium and magnesium compounds on metal oxides, such as silica and alumina, or porous polymer supports, such as styrene-divinylbenzene resins, is known.

In particular, British patent GB-A-2,028,347 teaches that catalyst components supported on inert supports, such as silica and alumina, are usually prepared by way of impregnating these supports with $MgCl_2$ solutions, evaporating the solvent and reacting the solid product obtained with a transition metal compound, particularly titanium. The maximum amount of $MgCl_2$ deposited on the support before the reaction with the transition metal compound is 75% by weight, corresponding to approximately 19% by weight of Mg. In this case the activity of the catalysts obtained from the above mentioned catalyst components, in relation to the Mg content, is such that it increases with the decreasing of the Mg content, and it starts decreasing when Mg content descreases to values smaller than 2% by weight. The maximum activity is obtained at values of Mg from 2 to 3% by weight and, according to the examples, it amounts to about 5000 g of polyethylene/g of catalyst component per hour and ethylene atmosphere. Due to the absence of electron-donor in the supported component, the above mentioned catalysts are not suitable for obtaining highly stereoregular alpha-olefin polymers.

Supported catalyst components obtained by impregnating a metal oxide, such as silica or alumina, with an organometallic magnesium compound, chosen in particular among Mg-alkyl and Grignard compounds, and then reacting the support with a titanium halide compound, are known from British patent GB-A1,306,044. The Mg content in the supported component thus obtained is about 4% by weight, as is shown in the examples. The catalysts are used in ethylene polymerization where their yields, however, are not sufficiently high (500-1400 g polymer/g catalyst component/hour, operating with an ethylene pressure of 10 atm).

From U.S. Pat. No. 4,263,168 it is known that catalyst components for propylene and other alpha-olefin polymerization are obtained by way of reaction of a metal oxide, such as silica or allumina, containing hydroxyls on the surface, with a Mg organometallic compound of the formula $MgR_{(2-x)}X_x$ (where R is a hydrocarbon radical, X a halbgen, and x a number from 0.5 to 1.5), and subsequent reaction with an electron-donor compound and titanium tetrachloride.

The organometallic magnesium compound is reacted in molar excess with respect to the hydroxyl groups, while the electron-donor compound is used in quantities up to 1 mole per mole of reacted magnesium compound, preferably 0.5 to 0.8 moles. The reaction with $TiCl_4$ is carried out preferably using an excess of $TiCl_4$.

As a variant, one can react the metal oxide, either before or after the reaction with the electron-donor compound, with a halogenating agent in such a quantity to supply at least one halogen atom per hydroxyl group. The halogenating agent can be added also during the reaction with the electron donor compound. The Mg content in the supported compounds described in the examples does not exceed 7%. The activity of catalysts obtained from the above mentioned catalyst components, however, is very low, i.e. in the order of tens of grams of polypropylene per gram of catalyst component at ambient pressure.

Magnesium halide based catalysts supported on porous supports, which have high activity and stereospecificity, besides reducing the content of undesired halogenated compounds which remain in the polymer, would allow, in a relatively simple manner, the control of the polymer morphology. In fact, in modern industrial processes of polyolefin production there is need for catalysts capable of producing a polymer with controlled morphologic characteristics (narrow particle size distribution and sufficiently high bulk density).

Published European patent application EP-A-344755, describes catalyst components obtained by supporting a Mg dihalide or Mg compounds which can be transformed to dihalide, in a porous polymer support, and then reacting the solid with a titanium halide or halogen alcoholate, optionally in the presence of an electron-donor compound. The Mg content in the catalyst components described in the examples is at the most 5.16% by weight.

The activity of the catalysts thus obtained does not exceed 4000 g polymer/g catalyst component in the case of polymerization of propylene where the titanium content in the catalyst component is 2%-3% by weight.

Said polymerization is carried out operating at about 7 atmospheres of propylene.

The examples also show that in the catalyst component the Ti/Mg ratio by weight varies from about 0.4 to about 0.8.

Moreover, published European patent application EP-A-0434082 describes catalyst components comprising a porous metal oxide (for example silica or alumina), on which there are supported a magnesium dihalide, a titanium halide or halogen alcoholate, and an electron-donor selected from particular classes of ethers.

The examples show maximum yields of isotactic polypropylene of about 4,000 g/g catalyst component operating with about 7 atmospheres of propylene, and a yield of 14000 g/g catalyst component operating in liquid propylene.

In this case, the high activity is due to the presence of the above mentioned ethers.

In the catalyst components of the examples, the magnesium content is at the most 5.5% by weight, the titanium content varies from about 1.5% to 2.5% by weight, and the Ti/Mg weight ratio varies from about 0.3 to 0.7.

US-A-5,064,799 describes catalysts components obtained from the reaction of a tetravalent titanium halide and an electron-donor compound with a solid obtained by reacting a metal oxide containing hydroxyl groups on the surface (such as silica or alumina) with an organometallic Mg compound of the formula $MgR_{2-x}X_x$, where R is a hydrocarbon radical, X is a halogen or an OR or COX' radical (where X' is halogen), and x is a number from 0.5 to 1.5, used in amounts such as not to reduce the titanium during the subsequent reaction of the solid with the titanium halide.

In the catalyst components of the examples, the maximum magnesium content is 10.65% by weight, the titanium content is from 2.5% to 5% by weight, and the Ti/Mg weight ratio is from about 0.3 to 1.5. The maximum yield in isotactic polypropylene is about 28000 g/g of catalyst component in liquid propylene.

Now it has been unexpectedly found that it is possible to obtain catalysts supported on porous polymers, which are particularly active in the polymerization $CH_2=CHR$ olefins, where R is hydrogen, or an alkyl radical with 1-6 carbon, or an aryl radical in particular phenyl, having high stereospecificity and capable of forming a polymer having controlled morphology. These catalysts are prepared starting from catalyst components obtained by reacting a tetravalent titanium halide or halogen alcoholate and an electron-donor compound, with a porous polymer support on which is supported a magnesium dihalide or a magnesium compound which does not contain Mg-C bonds and can be transformed into a dihalide. These catalysts components are characterized in that the Mg content, prior to the reaction with the titanium compound and present in the final catalyst component after the reaction with the titanium compound, is from 6% to 12% by weight with respect to the weight of the catalyst component. The performances of these catalysts are unexpected because, based on previous knowledge, it could not been foreseen that the maximum performance in terms of polymer activity and morphological properties, could be obtained with Mg contents from 6 to 12% by weight.

The above mentioned result is particularly unexpected taking into account that:

1) with said Mg contents, the titanium content is relatively low and can be compared to that of the catalyst components described in European patent application EP-A-344755, which are also supported on porous resins;

2) despite the low Ti/Mg weight ratios (typically lower than 0.25) the catalyst components of this invention can give isotactic polypropylene yields remarkably higher than those that can be obtained with all the catalysts components previously described.

According to the present invention the Mg content in the porous polymer supports, prior to the reaction with the titanium compounds, is from 6 to 12% by weight, and it is preferably chosen so as to have a Mg compound content deposited on the porous support corresponding as volume to the porosity of the initial polymer support. Mg compound contents higher than the porosity of the polymer support produce catalysts which will form polymers with poor morphological properties.

The Ti:Mg weight ratio is lower than 0.25 and is preferably from 0.22 to 0.05; the molar ratio Ti: electron-donor compound is from 0.3:1 to 3:1, preferably the ratio is equal to 1.

The polymer support has a porosity higher than 0.5 ml/g, preferably from 1 to 3 ml/g, and its pore diameter distribution is such that at least 70% of the pores have a radius greater than 100 Å, preferably from 150 to 350 Å (determinations carried out by using the B.E.T. method of nitrogen absorption).

The surface area (B.E.T.) is usually between 30 and 1000 m²/g. The polymer support is preferably in the form of microspheroidal particles having a diameter between 10 and 200 μm.

Any kind of polymer material, which does not react with the catalyst components and can be obtained in the form of particles with the above mentioned porosity and pore distribution, can be used.

Partially cross-linked polymers, which are used for the preparation of ion exchange resins, are preferably used. These polymers are obtained from styrene monomers, such as styrene, ethylbenzene, vinyltoluene, methylstyrene and cross-linked monomers, such as divinylbenzene and divinyltoluene.

Methods for the preparation of partially cross-linked copolymers are described in published EP-A-344755 European patent application (corresponding to U.S. Ser. No. 359234, now abandoned).

The polymer preferred are partially cross-linked styrene-divinylbenzene copolymers.

The preparation of the catalyst components according to the present invention is carried out by suspending the polymer support in a solution of a magnesium dihalide or magnesium compound that can be transformed into a dihalide, and by subsequently evaporating the solvent, or by dropwise addition of the magnesium dihalide or magnesium compound solution to the solid until the solid remains flowing; the operation can be repeated a number of times. The operating temperature is usually from 0° C. to 150° C.

The impregnation of the polymer support can also be carried out in a fluid bed thus keeping the support always flowing.

Magnesium compounds which can be used include alkyl-Mg-halides, Mg-dialkyls, alkyl-Mg-alcoholates, Mg-dialcoholates, Mg-halogen-alcoholates, Mg-dicarboxylates, Mg-halogen-carboxylates and Mg-alkyl carbonates.

These compounds are usually dissolved in aliphatic or aromatic hydrocarbons or ethers.

The magnesium halides are usually dissolved in alcohols, ethers, ketones, esters.

Preferred magnesium compounds are: $MgCl_2$, RMgCl, RMgBr, $MgR_2$, $Mg(OR')_2$, ClMgOR', BrMgOR', $Mg(OCOR)_2$, RMgOR and $mMg(OR)_2 \cdot pTi(OR)_4$ where R is a $C_1-C_{20}$ alkyl, $C_{3-20}$ cycloalkyl, or $C_{6-20}$ aryl, R' has the same meaning R or is —$Si(R)_3$, and m and p are numbers from 1 to 4.

When the supports contain magnesium compounds which are already halogenated or which do not contain Mg-alkyl bonds (i.e. they do not contain Mg—C bonds) the catalyst component is obtained by reacting said support with an excess of titanium halide or halogen alcoholate, preferably $TiCl_4$, and with an electron-donor compound, usually operating at a temperature from 0° C. to 135° C. The solid is separated hot from the excess titanium compound and washed carefully with anhydrous hexane or heptane until the chlorine ions in the filtrate disappear. The treatment with the titanium compound can be repeated.

When the supports contain magnesium compounds with Mg-alkyl bonds, in order to have a high activity of the catalysts, it is necessary to transform these catalysts, prior to the treatment with the above mentioned titanium compound, into magnesium halides or into magnesium compounds which cannot reduce the tetravalent titanium, that is into compounds which do not contain Mg—C bonds.

The compounds that can be used for this purpose are, for example, HCl, $Cl_2$, $SiCl_4$ and chlorisilanes, $HSiCl_3$, Al-alkyl halides, water, alcohols, carboxylic acids, orthoesters, esters, aldehydes, ketones and carbon dioxide. They can be used in stoichiometric amounts, or in excess with respect to the Mg-alkyl bonds, at a temperature from 0° C. to 150° C.

The electron-donor compound which is used in the synthesis of stereospecific catalyst components can be caused to react before or after the treatment with the Ti compound. If it is caused to react afterwards, it is convenient to carry out the reaction of an aromatic hydrocarbon medium, such as benzene or toluene, or in a halogenated hydrocarbon.

The best results, however, are achieved when the electron-donor compound is caused to react before, or at the same time as the titanium compound.

Any electron-donor compound that can form complexes with magnesium halides and/or tetravalent titanium halides can be used for the preparation of the catalyst component of the present invention. Examples of compounds that can be used are ethers, esters, ketones, lactones and compounds containing N, P and/or S atoms. The compounds preferred are the esters of bicarboxylic aromatic acids, such as phthalic acid and ester of malonic, pivalic, succinic and carbonic acids.

The ethers described in EP-A-361494 (corrisponding to U.S. Pat. No. 4,971,937) having the following formula, are particularly suitable:

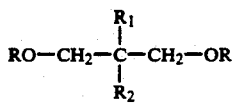

where R, $R_1$ and $R_2$ are the same or different and are linear or branched $C_{1-18}$ alkyl, $C_{3-18}$ cycloalkyl, $C_{6-18}$ aryl, $C_{7-18}$ alkylaryl or arylalkyl groups, and $R_1$ or $R_2$ can also be hydrogen. In particular, R is methyl and $R_1$ and $R_2$ are the same or different and are ethyl, propyl, isopropyl, butyl, isobutyl, t-butyl, neopentyl, isopentyl, phenyl, benzyl or cyclohexyl.

Representative examples of said ethers are: 2,2-diisobutyl-1,3-dimethoxypropane, 2-isopropyl-2-isopentyl-1,3-dimethoxypropane, 2,2-bis(cyclohexyl)-1,3-dimethoxypropane and 2,2-bis(cyclohexyl)-1,3-dimethoxypropane.

Specific examples of esters are diisobutyl, dioctyl and diphenyl phthalate, benzyl-butyl phthalate, diisobutyl and diethyl malonate, ethyl pivalate, ethyl-phenyl carbonate and diphenyl carbonate.

The catalyst components of the present invention form, with the Al-alkyl compounds, preferably Al-trialkyl, catalysts which are suitable for the $CH_2=CHR$ olefin polymerization, where R is hydrogen or an alkyl radical with 1-6 carbon atoms, or an aryl radical, in particular phenyl, and for the polymerization of their mixtures optionally containing minor portions of diene.

Representative examples of Al-trialkyl compounds are Al-triethyl, Al-triisobutyl, Al-tri-n-butyl and linear or cyclic compounds containing two or more Al atoms which are bridge bonded to 0, N atoms or through $SO_4$ and $SO_3$ groups. Aluminum dialkylhalides can also be used in mixture with other Al-trialkyl. The Al-alkyl compound is used with an Al:Ti ratio usually ranging from 1 to 1000.

In order to improve the catalyst stereospecificity, it is often better to use, together with an Al-alkyl compound, an electron-donor in an amount usually equal to 0.01-0.25 moles/per mole of Al-alkyl compound.

The electron-donor compound is preferably chosen among the ethers, esters, silicon compounds which contain at least a Si—OR bond (R is a hydrocarbon radical) and 2,2,6,6-tetramethylpiperidine.

When the solid catalyst component contains an ester or a bicarboxylic aromatic acid, such as phthalic acid, or an ester of the malonic, maleic, picalic, succinic or carbonic acid, the electron-donor compound to be used together with the Al-alkyl compound is preferably chosen among silicon compounds containing at least a Si—OR bond.

Examples of said silicon compounds are: phenyltriethoxysilane, diphenylmethoxysilane, dicyclopentyldimethoxysilane, methyl-tert-butyl-dimethoxysilane, methylcyclohexyldimethoxysilane, di-tert-butyl-dimethoxysilane, i-propyl-tert-butyl-dimethoxysilane.

When in the catalyst component there is an ether chosen among those described in EP-A-361494, the catalyst stereospecificity is high enough not to require an electron-donor compound together with the Al-alkyl.

The olefin polymerization is carried out according to known methods by operating in liquid phase, liquid monomer, or in monomer solution in inert hydrocarbon solvent, or in gas phase, or even by combining polymerization in liquid and gas phases.

The polymerization temperature is usually from 0° C. to 150° C., preferably from 60° C. to 100° C., operating at atmospheric pressure or higher.

The catalysts of the present invention are used both in homopolymerization and copolymerization of olefins. In the case of copolymers, the catalysts are used for instance for the preparation of random crystalline copolymers of propylene with minor proportions of ethylene, and optionally of butene, and higher alpha olefins, or of elastomeric ethylene compolymers optionally containing minor proportions of a diene (for example butadiene or hexadiene-1,4).

The catalysts of the present invention can also be used in the sequential polymerization of propylene and mixtures of propylene with ethylene and/or butene and superior alpha olefins to form impact polypropylene.

Prior to polymerization, the catalysts can be precontacted with small amounts of olefin monomer (prepolymerization) either operating in suspension in a hydrocarbon solvent (such as hexane or heptane) and by polymerizing at a temperature from the room temperature to 60° C., thus producing polymers in amounts that are 0.5-3 times the weight of the solid catalyst component, or operating in liquid monomer, producing, in this case, up to a 1000 g of polymer per g of solid component.

The following examples are provided to illustrate the invention, without limiting the same.

EXAMPLE 1

1-A) Synthesis of Styrene-divinylbenzene Resin

Into a 2-liter-reactor is introduced a suspension system consisting of distilled water (450 ml), a 5% aqueous solution brought to pH 7 with NaOH of ROAGIT S, produced by Rohm and Haas (16.2 ml), bleaching clay (PROLIT C10 by Caffaro S.p.A.) (2.25 g) and NaCl (0.45 g).

It is stirred at room temperature for 30 minutes and then is introduced the monomer system prepared separately consisting of g 100 of styrene, g 67.5 of divinylbenzene (50%) in toluene (225 ml) and n-octane (75 ml) containing 3 g of benzoyl peroxide. The polymerization is carried out by stirring (350 rpm) for 10 hours at 80° C.

The spherical copolymer thus obtained is separated by centrifugation and washed repeatedly with water. It is then dried and extracted for 24 hours in Kumagava with acetone, and then, after drying for 24 hours, with ethanol and after an additional drying with an eptane solution 1 M of AlEt$_3$, it is washed with heptane and vacuum dried.

A resin with a surface area of 376 m$^2$/g and a 2.51 ml/g porosity (measured in nitrogen by way of B.E.T.) is thus obtained.

1-B) Impregnation of the Resin with Butylmagnesium Chloride (BuMgCl)

250 ml tubular reactor equipped with a porous bottom septum previosly purged with anhydrous nitrogen through the septum, 2.5 g of resin are introduced at ambient temperature and under nitrogen flow. 25 ml of a solution of BuMgCl 1 M in tetrahydrofuran (THF) are then dripped keeping the resin suspended by a nitrogen flow which prevents agglomerate formation.

When the impregnation is completed, the resin Mg content will be 7.6% by weight.

1-C) Reaction Between Supported BuMgCl and Ethanol (EtOH)

The resin impregnated with BuMgCl is treated in the same reactor described above with 20 ml of a THF solution containing EtOH in an equimolecular amount with respect to the supported BuMgCl. The Mg content of the resulting product is 7.9%.

1-D) Titanation of the Supported Resin

The product prepared in 1-C is added slowly under nitrogen atmosphere, while stirring, and at room temperature, to 100 ml of TiCl$_4$. Then, 2-i-amyl-2-i-propyl-1, 3-dimethoxypropane (DMP) in amounts equal to ⅓ moles with respect to the supported Mg are added, warmed at 100° C., and allowed to react at this temperature for 2 hours.

The product is then filtered hot, additional 100 ml of TiCl$_4$ are added, and the treatment is repeated at 100° C. for 2 hours. When completed, it is filtered hot and washed with anhydrous n-heptane, twice at 90° C. and 3 times at room temperature.

The composition of the solid catalyst component thus obtained is reported in Table 1.

EXAMPLES 2-6

The procedure and ingredients of Example 1 are used except that compounds different from ethanol are used in order to carry out the treatments described in 1-C. The compounds used and the composition of the solid catalyst components thus obtained are reported in Table 1.

EXAMPLE 7

The procedure and ingredients of Example 1 are used except that an excess of gaseous hydrochloric acid is used in the 1-C treatment instead of EtOH, which acid is bubbled directly into the tubular reactor. The composition of the solid catalyst component thus obtained is reported in Table 1.

EXAMPLE 8

The procedure and ingredients of Example 7 are used except that an excess of carbon dioxide is used instead of hydrochloric acid. The composition of the solid catalyst component thus obtained is reported in Table 1.

EXAMPLE 9

2.5 g of resin obtained Example 1-A are suspended in 20 ml of EtOH in a rotavapor flask and stirred under inert atmosphere at room temperature for 1 hour. Then EtOH is distilled under vacuum to obtain a flowing product; the EtOH content absorbed in the above mentioned product is equal to 56% by weight.

The impregnated resin is introduced into the tubular reactor described in Example 1, then a solution of BuMgCl 1 M in THF in a stoichiometric amount with respect to EtOH is dripped. The Mg content in the impregnated resin is 9.5 by weight. The titanation is carried out as described in 1-D. The composition of the solid catalyst component thus obtained is reported in Table 2.

EXAMPLE 10

The procedure and ingredients of for Example 9 are used except that the EtOH absorbed is removed by heating until the EtOH content is equal to 30% by weight. The composition of the solid catalyst component thus obtained is reported in Table 2.

EXAMPLE 11

22.5 ml of BuMgCl 1M solution in THF are introduced at room temperature under inert atmosphere into a rotavapor flask, then an stoichiometric amount of EtOH with respect to BuMgCl is added slowly while stirring.

Thereafter into the solution thus obtained 2.5 g of the resin prepared in Example 1-A are suspended and stirred for 30 minutes and the THF is evaporated until a flowing solid product having a Mg content of 7.1% by weight is obtained. The impregnated resing is titanated as described in Example 1-D. The composition of the solid catalyst component thus obtained is reported in Table 2.

EXAMPLE 12

2 g of resin prepared in Example 1-A are suspended at room temperature under inert atmosphere in a rotavapor flask into a solution containing 1.9 g of MgCl$_2$ in 70 ml of THF. It is stirred for 1 hour and the THF is then evaporated until a flowing solid product having a Mg content of 6.8 by weight is obtained.

The impregnated resin is titanated as described in Example 1-D. The composition of the solid catalyst component thus obtained is reported in Table 2.

EXAMPLE 13

The procedure and ingredients of Example 12 are used except that a 20 ml n-heptane solution containing 6.12 g of Ti(OC$_4$H$_9$)$_4$.2.5Mg(OC$_4$H$_9$)$_2$ adduct is used instead of MgCl$_2$ in THF. The solid obtained has a Mg content equal to 6% by weight. The impregnated resin is titanated as described in Example 1-D. The composition of the solid catalyst component obtained is reported in Table 2.

EXAMPLE 14

5.5 g of resin prepared in Example 1-A are introduced at room temperature and in inert atmosphere to a 100 ml flask equipped with dripper and mechanical agitator, then 9.7 ml of a MgCl$_2$ solution in EtOH (concentration 150 g/l ) are dripped slowly into the flask while stirring.

The solvent is evaporated, then dripped and evaporated twice more: 11.5 g of a solid product containing 4.35 g of MgCl$_2$, equal to a Mg content of 9.6% by weight, are obtained. The impregnated resin is titanated as in Example 1-D. The composition of the solid catalyst component obtained is reported in Table 2.

EXAMPLE 15

The procedure and ingredients of Example 1 are used except that, instead of DMP, diisobutyl phthalate (DIBF) in a 1:3 mole ratio with respect to the supported Mg is used in the titanation described in 1-D. The composition of the solid catalyst component obtained is reported in Table 2.

COMPARATIVE EXAMPLE 1

Using the reactor described in Example 1, 2.5 g of resin prepared in Example 1-A are treated with damp nitrogen until a water content of 3.5% by weight is obtained. Then, the impregnated resin is treated with an amount of BuMgCl 1 M in THF equimolecular with respect to water and titanated as in Example 1-D.

The composition of the solid catalyst component obtained is reported in Table 2.

COMPARATIVE EXAMPLE 2

The procedure and ingredients of Example 1 except that 2.5 g of resin prepared in 1-A are impregnated with 6 ml of a BuMgCl 1M solution in THF. The composition of the solid catalyst component is reported in Table 2.

COMPARATIVE EXAMPLE 3

The procedure and ingredients of Example 2 are used except that DIBF instead of DMP is used in the titanation. The composition of the solid catalyst component obtained is reported in Table 2.

EXAMPLES 16–30 AND COMPARATIVE EXAMPLES 4–6

Propylene Polymerization

Method A

Into a 2000 ml stainless steel autoclave equipped with an anchor agitator are introduced under vacuum at 20° C. 20 ml of heptanic suspension containing a proper amount of catalyst component, 5 mmoles of Al(C$_2$H$_5$)$_3$, 800 ml of hydrogen and 500 g of propylene. The content is heated at 70° C. and polymerized for 3 hours. The polymer obtained is dried and extracted by means of boiling heptane for the determination of the isotactic index.

Method B

The procedure and ingredients of Method A are used except that 0.25 mmoles of diphenyldimethoxysilane (DPMS) and 5 mmoles of Al(C$_2$H$_5$)$_3$ are added to a heptane suspension containing the catalyst component.

The method and catalysts used, the polymerization results and properties of the polymers obtained are reported in Table 3.

EXAMPLE 31

Ethylene Polymerization

A suspension containing 1000 ml of anhydrous heptane, 5 mmoles of Al(i-C$_4$H$_9$)$_3$ and 52 mg of the catalyst component prepared in Example 1 are introduced under vacuum at 65° C. into the autoclave used in Examples 16–30, 4 atm of hydrogen and ethylene are introduced up to a total pressure of 11 atm. The content is polymerized at 70° C. for 2 hours, feeding the monomer continuously in order to keep pressure constant. After filtration and drying, 245 g of polymer are isolated, and a yield of 4700 g PE/g of catalyst component is obtained, with an intrinsic viscosity of 1.9 dl/g and a F/E degrees ratio of 30 (MIE and MIF are determined as per ASTM D-1238).

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

TABLE 1

| COMPOSITION OF THE CATALYST COMPONENT | | | | | |
|---|---|---|---|---|---|
| Ex. | Reagent used in treatment C | Mg weight % | Ti weight % | Ti/Mg | DMP weight % |
| 1 | ethanol | 8.8 | 1.6 | 0.18 | 12.6 |
| 2 | acetic acid | 8.8 | 1.1 | 0.12 | 11 |
| 3 | trimethyl orthoformiate | 9.0 | 1.6 | 0.17 | 11.0 |
| 4 | methylethylketone | 8.5 | 1.8 | 0.21 | 10.1 |
| 5 | ethyl acetate | 8.3 | 1.5 | 0.18 | 12.0 |
| 6 | water | 9.8 | 1.7 | 0.17 | 9.2 |
| 7 | hydrochloric acid | 11.7 | 1.9 | 0.16 | 10.5 |
| 8 | carbon dioxide | 11.8 | 1.6 | 0.13 | 13.4 |

TABLE 2

| COMPOSITION OF THE CATALYST COMPONENT | | | | | |
|---|---|---|---|---|---|
| Ex. n. | Mg weight % | Ti weight % | Ti/Mg | DMP weight % | DIBF weight % |
| 9 | 10.9 | 2.0 | 0.18 | 17.6 | — |
| 10 | 8.7 | 1.8 | 0.21 | 7.4 | — |
| 11 | 8.5 | 1.4 | 0.16 | 13.9 | — |
| 12 | 8.8 | 1.5 | 0.17 | 9.6 | — |
| 13 | 10.3 | 2.0 | 0.19 | 19.7 | — |
| 14 | 9.7 | 1.4 | 0.14 | 13.1 | — |
| 15 | 8.6 | 1.8 | 0.21 | — | 13.6 |
| 1 comparative | 3.2 | 0.8 | 0.25 | 2.3 | — |
| 2 comparative | 3.6 | 0.9 | 0.25 | 2.4 | — |
| 3 comparative | 3.8 | 1.0 | 0.26 | — | 2.8 |

TABLE 3

| Ex. n. | Cat. Ex. | Comp. (mg) | Method | Yield gPP/g Cat. Comp. | I.I. % | (η) dl/g | Bulk density g/ml |
|---|---|---|---|---|---|---|---|
| 16 | 1 | (8.4) | A | 26800 | 98.2 | 3.75 | 0.39 |
| 17 | 2 | (14) | A | 15000 | 94.1 | 2.62 | 0.42 |
| 18 | 3 | (13.5) | A | 17000 | 96.6 | 2.67 | 0.44 |
| 19 | 4 | (11) | A | 22700 | 92.6 | 2.73 | 0.38 |
| 20 | 5 | (9) | A | 24300 | 97.4 | 3.27 | 0.41 |
| 21 | 6 | (7.3) | A | 31500 | 91.7 | 1.90 | 0.41 |
| 22 | 7 | (10) | A | 22000 | 97.8 | 2.55 | 0.40 |

TABLE 3-continued

| Ex. n. | Cat. Ex. | Comp. (mg) | Method | Yield gPP/g Cat. Comp. | I.I. % | (η) dl/g | Bulk density g/ml |
|---|---|---|---|---|---|---|---|
| 23 | 8 | (12.9) | A | 19300 | 98.4 | 3.89 | 0.39 |
| 24 | 9 | (6.1) | A | 36000 | 98.9 | 2.59 | 0.36 |
| 25 | 10 | (10.4) | A | 21600 | 97.1 | 3.02 | 0.41 |
| 26 | 11 | (10.2) | A | 21500 | 98.2 | 2.57 | 0.40 |
| 27 | 12 | (11) | A | 19000 | 98.2 | 2.59 | 0.35 |
| 28 | 13 | (6) | A | 38000 | 98.1 | 3.05 | 0.36 |
| 29 | 14 | (13) | A | 16000 | 98.3 | 2.66 | 0.39 |
| 30 | 15 | (17.8) | B | 14000 | 97.3 | 2.72 | 0.43 |
| 4 comp. | 1 comp. | (27.8) | A | 7900 | 97.8 | 3.30 | 0.40 |
| 5 comp. | 2 comp. | (23.3) | A | 9000 | 98.4 | 3.45 | 0.40 |
| 6 comp. | 3 comp. | (33) | B | 6000 | 97.4 | 2.80 | 0.41 |

I claim:

1. A catalyst component for the polymerization of olefins obtained by reaction of a tetravalent titanium halide or halogen alcoholate and of an electron-donor compound with a porous polymer support, having a porosity higher than 0.5 cc/g, on which is supported a Mg dihalide or a Mg compound, which does not contain Mg—C bonds and can be transformed into a dihalide, characterized in that the amount of the Mg supported on the porous polymer support, before the reaction with the Ti compound and present in the final catalyst component after the reaction with the Ti compound, is from 6 to 12% by weight with respect to the weight of the catalyst component.

2. The component of claim 1, wherein the Ti compound is $TiCl_4$ and the electron-donor compound is selected from the diethers having the formula

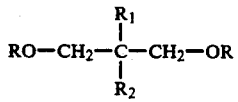

where R, $R_1$ and $R_2$ are the same or different and are $C_1$-$C_{18}$ linear or branched alkyl, $C_3$-$C_{18}$ cycloalkyl, $C_6$-$C_{18}$ aryl, $C_7$-$C_{18}$ alkylaryl or arylalkyl radicals, and $R_1$ or $R_2$ can also be hydrogen.

3. The component of claim 2, wherein R is methyl and $R_1$ and $R_2$ are the same or different and are ethyl, propyl, isopropyl, butyl, isobutyl, tert-butyl, neopentyl, isopentyl, phenyl, benzyl or cyclohexyl.

4. The component of claim 2, wherein the Ti:Mg weight ratio is smaller than 0.25 and the Ti:electron-donor compound molar ratio is from 0.3:1 to 3:1.

5. The component of claim 3, wherein the Ti:Mg weight ratio is smaller than 0.25 and the molar ratio Ti:diether is from 0.3:1 and 3:1.

6. The component of claim 1, wherein the porous polymer support has porosity of from 1 to 3 ml/g and the radius of at least 70% of the pores is greater than 100 Å.

* * * * *

UNITED STATES PATENT AND TRADEMARK OFFICE
CERTIFICATE OF CORRECTION

PATENT NO. : 5,244,855

DATED : September 14, 1993

INVENTOR(S) : Giampiero Morini et al

It is certified that error appears in the above-identified patent and that said Letters Patent is hereby corrected as shown below:

At col. 5, line 39, change "2,2-bis(cyclohexyl)-1,3-dimethoxypropane" to --2,2-bis(cyclohexylmethyl)-1,3-dimethoxypropane--.

At col. 7, line 2, change "eptane" to --heptane--.

At col. 7, line 11, before "250 ml" insert --Into a--.

Signed and Sealed this

Twenty-ninth Day of March, 1994

Attest:

BRUCE LEHMAN

*Attesting Officer*     Commissioner of Patents and Trademarks